United States Patent
Maruta

(10) Patent No.: US 7,477,328 B2
(45) Date of Patent: Jan. 13, 2009

(54) PLASMA TELEVISION, DISPLAY PANEL TYPE TELEVISION, AND FABRICATION METHOD FOR DISPLAY PANEL TYPE TELEVISION

(75) Inventor: Naoto Maruta, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 545 days.

(21) Appl. No.: 11/107,134

(22) Filed: Apr. 14, 2005

(65) Prior Publication Data

US 2005/0237438 A1 Oct. 27, 2005

(30) Foreign Application Priority Data

Apr. 16, 2004 (JP) ............................. 2004-121732

(51) Int. Cl.
*H04N 3/12* (2006.01)
(52) U.S. Cl. ..................... 348/797; 348/787; 348/789; 348/794
(58) Field of Classification Search ................ 348/787, 348/789, 794, 818, 823, 825, 836, 843, 797; 313/567; *H04N 3/12*
See application file for complete search history.

(56) References Cited

U.S. PATENT DOCUMENTS 4,191,725 A * 3/1980 Armstrong et al. .......... 264/261
6,229,085 B1 * 5/2001 Gotoh et al. ................ 174/353
2002/0078459 A1 * 6/2002 McKay ........................ 725/78

FOREIGN PATENT DOCUMENTS

| JP | H04-028621 A | 3/1992 |
|---|---|---|
| JP | 2002-278467 A | 9/2002 |
| JP | 2003-5669 | 1/2003 |
| JP | 2003-005669 * | 1/2003 |
| JP | 2003-029643 A | 1/2003 |
| JP | 2004-045778 A | 2/2004 |
| JP | 2004-069888 A | 3/2004 |
| JP | 2004-117874 A | 4/2004 |

OTHER PUBLICATIONS

Japan Notice of the reason for refusal, dated Jun. 23, 2007.

* cited by examiner

*Primary Examiner*—Trang U Tran
(74) *Attorney, Agent, or Firm*—Yokoi & Co., U.S.A., Inc.; Peter Ganjian

(57) ABSTRACT

Conventionally, it was difficult to maintain parallelism between an optical filter and a PDP, and also the weight of the optical filter was put on the PDP.

With a PDP 10 and a frame 30 separately fixed to a bracket 20 connecting to a leg member 60, fix an optical filter 80 to the frame 30. As a result, the optical filter 80 is fixed with required parallelism maintained with the PDP 10, and also the optical filter 80 and the PDP 10 will not put their weight on each other, thus eliminating unnecessary loads on the optical filter 80 and the PDP 10. Also, unnecessary flaws and distortions in a casing 40 can be prevented during the product manufacturing.

11 Claims, 7 Drawing Sheets

(1)

(2)

PLASMA TELEVISION, DISPLAY PANEL TYPE TELEVISION, AND FABRICATION METHOD FOR DISPLAY PANEL TYPE TELEVISION

BACKGROUND OF THE INVENTION

1. Field of the Invention

The present invention relates to a plasma television, a display panel type television, and a fabrication method of the display panel type television.

2. Description of the Prior Art

As a related prior art, there is known a plasma display apparatus wherein a glass substrate optical filter 5 is fixed on the front side of a front frame 3 (refer to the Japanese Patent Laid-Open No. 2003-5669, for example).

In this apparatus, after a plasma display panel 8 and a back cover 6 are installed with screws 9, the glass substrate optical filter 5 is slid into a groove on a hook-shaped projection 4 and temporarily fixe on the front side of the front frame 3. Then, the four corners of the glass substrate optical filter is pressed with pressure fixtures 2 and secured on the front side of the front frame with screws 7. Then, a front side outer case is overlaid on the glass substrate optical filter.

In the prior art described above, the glass substrate optical filter 5 is fixed by screwing the four corners of it with the pressure fixtures. However, the worker is not always able to fasten all the screws evenly. Unless all the screws are fastened evenly, it is difficult to keep the glass substrate optical filter and a plasma display panel 8 in parallel.

Moreover, in the prior art, both the glass substrate optical filter 5 and the plasma display panel 8 are fixed on the front frame 3. This causes the glass substrate optical filter 5 and the plasma display panel 8 to put their own weights on each other via the front frame 3, resulting in unnecessary loads being placed on both of these components.

SUMMARY OF THE INVENTION

The present invention has been made in view of the above-mentioned problems, and therefore an object of the invention is to provide a plasma television, a panel display type television, and a fabrication method of the panel display type television that allows easy and secure fixing of an optical filter at a predetermined position on a frame member, as well as protection of the optical filter and a panel type display apparatus.

In order to achieve the above object, one aspect of the present invention resides in a plasma television which comprises a casing having an approximately rectangular opening formed around a center of its front wall; a plasma display panel disposed in said casing with its display surface facing the opening; a frame member surrounding said plasma display panel and disposed in said casing; an optical filter fixed to said frame member; and a predetermined fixture to fix said optical filter to said frame member. Said plasma display panel is fixed, at a rear side, to a bracket that connects to a leg member standing almost vertically and supports almost whole of said plasma television at a predetermined height. Said frame member is fixed to the bracket at a portion corresponding to each end of upper and lower portions of said bracket.

Said fixture is equipped with a first fixture that fixes each of the right and left edges of said optical filter and a second fixture that fixes each of the top and bottom edges of said optical filter, said fixture fixing said optical filter with required parallelism maintained with the display surface of said plasma display panel.

Said first fixture comprises: an edge contact portion that contacts right and left front edge portions almost across a height of said frame member; a step forming portion that is an edge along a longitudinal direction of said edge contact portion, and bends almost vertically from an edge facing an inside of said frame member to form a predetermined step from said edge contact portion; and a filter contact portion that bends almost vertically toward an inside of said frame member from an edge along a longitudinal direction of a side that does not contact said edge contact portion of said step forming portion, and contacts right and left front edges of said optical filter, almost across the height of the optical filter.

Said step forming portion is provided with an insert portion at both ends of said step forming portion that is formed on almost the same plane as said step forming portion, and projects in a direction opposite to a direction of forming a step from said edge contact portion, by a distance equal to a sum of a thickness of said contact portion and said frame member.

Said frame member has an elongated hole formed at each portion that faces said insert portion when the first fixture is installed, for passing said insert portion through it.

According to the aspect of the present invention configured as above, the plasma television comprises a casing that has an nearly rectangular opening formed around the center of the front wall; a plasma display panel disposed in said casing with the display surface facing said opening; a frame member disposed in said casing and surrounding said plasma display panel; an optical filter fixed to said frame member; and a predetermined fixture to fix said optical filter to said frame member.

Here, almost whole said plasma television is supported at a predetermined height by a bracket that connects to a leg member almost vertically standing. That is, the plasma display panel is fixed to the bracket at its rear side. Also, the frame member is fixed to said bracket at the portion corresponding to each edge portion of the top and bottom portions of the bracket.

Said fixture consists of a first fixture that fixes the right and left edges of the optical filter respectively, and a second fixture that the top and bottom edges of the optical filter respectively. Accordingly, the edge contact portion and the filter contact portion of the first fixture forms a step across the step forming portion.

An insert portion is formed at both ends of the step forming portion. Said insert portion is formed on almost the same plane as the step forming portion, extends a distance equal to the sum of the thickness of said edge contact portion and that of the frame member, and projects in the direction nearly parallel to the longitudinal direction of said step forming portion. Meanwhile, the frame member has an elongated hole for passing said insert portion through, which is formed at each area facing said insert portion when the first fixture is installed.

That is, the insert portion is passed through said elongated hole, and the first fixture is installed so that the edge contact portion contacts the right and left front edge portions nearly across the height of the frame member. By this, the filter contact portion is brought into contact with the right and left front edges of the optical filter, and also the optical filter is pressed against the frame member. As a result, the front and back of the optical filter is held by the filter contact portion and the front edge portion respectively. Fixing like this ensures that the optical filter maintains required parallelism with the frame member, thus making it possible for the optical filter to keep it parallel also with the plasma display panel, which keeps it parallel with said frame member.

In the above configuration, the weight of the frame member and the optical filter fixed to said frame member is put on the bracket alone. Likewise, the weight of the plasma display panel is put on the bracket alone. This prevents problems such as that the weight of the plasma display panel is put on the frame holding the optical filter, causing a distortion in said frame member, or that the weight of the optical filter is put on the plasma display panel that is a precision machine, putting an unnecessary load on it.

In another aspect of the present invention, there is provided a panel display type television comprising: a casing; a frame member disposed in said casing; a panel type display apparatus surrounded with said frame member and disposed in said casing; an optical filter fixed to said frame member; and a predetermined fixture to fix said optical filter to said frame member.

Said frame member and said panel type display apparatus are separately fixed to a support member that supports almost whole of said panel display type television, without putting the weight of said frame member and said panel type display apparatus on each other.

Said fixture fixes said optical filter to a front edge portion of said frame member, with required parallelism maintained with a display surface of said panel type display apparatus.

In the aspect configured as above, the panel display type television comprises the casing; the frame member disposed in said casing; the panel type display apparatus surrounded with said frame member and disposed in said casing; the optical filter fixed to said frame member; and the predetermined fixture to fix said optical filter to said frame member.

Here, the frame member and the panel type display apparatus are separately fixed to the support member that supports nearly whole of the panel display type television. The optical filter is fixed to the frame member with the fixture.

That is, the weight of the frame member and the optical filter fixed to said frame member is put on the support member alone. Likewise, the weight of the plasma display panel is put on the bracket alone. This prevents problems such as that the weight of the plasma display panel is put on the frame holding the optical filter, causing a distortion in said frame member, or that the weight of the optical filter is put on the plasma display panel that is a precision machine, putting an unnecessary load on it. Also, said fixture can fix said optical filter to the front edge portion of said frame member, with required parallelism maintained with the display surface of the panel type display apparatus.

In another aspect of the present invention, said fixture is equipped with the first fixture that fixes each of right and left edges of said optical filter and the second fixture that fixes each of top and bottom edges of said optical filter.

The first fixture comprises an edge contact portion that contacts right and left front edge portions almost across a height of the frame member; a step forming portion that is an edge along the longitudinal direction of said edge contact portion, and bends almost vertically from an edge facing an inside of said frame member to form a predetermined step from said edge contact portion; and a filter contact portion that bends almost vertically toward an inside of said frame member from an edge along a longitudinal direction of a side that does not contact an edge contact portion of said step forming portion.

In the aspect configured as above, said fixture comprises the first fixture that fixes the right and left edges of said optical filter respectively, and the second fixture that fixes the top and bottom edges of the optical filter respectively. The first fixture comprises the edge contact portion, the step forming portion, and the filter contact portion. Using such first fixture will allow the right and left edges of the optical filter to be held from its front and back, with the filter contact portion and said right and left front edges, when the edge contact portion is brought into contact with the right and left front edges, nearly across the height of the frame member. Fixing the optical filter like this ensures that the optical filter maintains required parallelism with the frame member, and thereby maintain required parallelism also with the panel type display apparatus, which keeps it parallel with said frame member.

In another aspect, an insert portion is formed at both ends of said step forming portion that is formed on almost the same plane as said step forming portion, and projects in a direction opposite to a direction of forming the step from said edge contact portion, by a distance equal to a sum of a thickness of said contact portion and said frame member; and said frame member has an elongated hole formed at each portion that faces said insert portion when said first fixture is installed, for passing said insert portion through it.

In the aspect configured as above, the insert portion is formed at both ends of the step forming portion. Also, on the frame member, an elongated hole is formed to pass the insert portion through it, at each area that faces said insert portion when said first fixture is installed. Then, the insert portion is inserted into the elongated hole from its end, and the edge contact portion is brought close to the front edge portion of the frame member, while passing the entire insert portion through the elongate hole. By this, the edge contact portion is brought into contact with the frame member on the front side of the frame member, and a portion projecting in the direction almost parallel to the longitudinal direction of said step forming portion of the insert portion is brought into contact with the frame member, on the back of the frame member. That is, according to the above configuration, it is possible to secure a predetermined distance between the front edge portion of the frame member and the filter contact portion, simply by inserting the insert portion entirely into the elongated hole. As a result, the pressure of the filter contact portion against the optical filter becomes constant, and the position at which the optical filter is held horizontally becomes constant.

As yet another embodiment, a step formed by said step forming portion is set to the distance equal to a predetermined thickness to which a conductive gasket inserted between said optical filter and the front edge portion of said frame member is compressed, when said fixture is fixed to said frame member and said filter contact portion presses against the right and left front edges of said optical filter.

In the aspect configured as above, the step formed by the step forming portion is not set to a distance long enough to hold the optical filter between the front edge portion of the frame member and the filter contact portion. There is a case where a predetermined gasket made of a conductive material is inserted between the optical filter and the frame member. Therefore, in the above configuration, said distance of the step is set so that said gasket is compressed to a predetermined thickness, when the filter contact portion presses against the right and left front edges of the optical filter. As a result, it is possible to compress said gasket to the optimum thickness to have the shielding effect for electromagnetic waves.

As another embodiment of the present invention, said step may be set to the sum of the thickness of the optical filter and the optimum thickness of the gasket.

Furthermore, in this case, said gasket may be made of conductive material such as metal mesh, and may be constructed to have the shielding effect when inserted between the longitudinal member of said frame member and the optical filter, and to be compressed to 50% of the original thickness to secure a sufficient contact area with the longitudinal member and the optical filter, thereby to prevent leakages of high frequency radiation from the gap between the members.

As a result, it is possible to fix the optical filter with required parallelism maintained with the PDP between the filter contact area and the front of the longitudinal member, and also to compress the gasket to an optimal thickness.

In another aspect, a predetermined space may be inserted between said frame member and said panel type display apparatus so as to maintain a predetermined distance between said panel type display apparatus and said optical filter.

That is, the member to be inserted between the panel type display apparatus and the optical filter is not limited to the frame member or the gasket. For example, a plastic spacer may be inserted between the frame member and the panel type display apparatus in order to maintain a predetermined distance between the panel type display apparatus and the optical filter.

In another aspect, said support member may comprise a leg member standing almost vertically and a bracket that connects to said leg member and supports almost whole of the panel display type television at a predetermined height.

In the aspect configured as above, the support member consists of the leg member standing almost vertically, and the bracket that connects to said leg member and supports almost whole of the panel display type television at the predetermined height. Therefore, by fixing said panel type display apparatus and the frame member separately, the panel type display apparatus and the frame member are supported by the support member at the predetermined height, without putting their weights on each other. Also, since the optical filter is fixed to the frame member, said optical filter and the panel type display apparatus will not put their weights on each other.

In another aspect, said panel type display apparatus may be a plasma display panel.

Generally, the plasma display panel tends to be heavier as compared to other panel type display apparatuses including LCD panels. Especially, with the increase in panel size in recent years, the effect of the weight of a panel type display apparatus on its casing cannot be ignored. Moreover, as the panel size increases, the optical filter to cover the front side of the panel also increases, resulting in an increase in its weight. In this embodiment, even if a heavy plasma display panel or optical filter is employed, the frame member and optical filter and the plasma display panel will not put their weight on each other.

The present invention can be understood not only as an apparatus, namely a panel display type television, but also as a fabrication method of the apparatus.

Therefore, still another aspect resides in a fabrication method for a panel display type television which comprises a casing; a frame member disposed in said casing; a panel type display apparatus surrounded with said frame member and disposed in the casing; an optical filter fixed to said frame member; and a predetermined fixture to fix said optical filter to said frame member.

In the aspect, the method comprises fixing said frame member and the panel type display apparatus separately to a support member that supports almost whole of the panel display type television; and fixing said optical filter to the front edge portion of the frame member with said fixture, with required parallelism maintained between the front edge portion and the display surface of the panel type display apparatus.

Needless to say, all the foregoing embodiments of the present invention can be understood as the embodiments of the method, and it is possible to apply the dependent claims for the invention of the apparatus to the independent claims of the invention of the method.

As described above, according to the present invention it is possible to provide the plasma television that prevents distortions in the frame member of unnecessary loads on the plasma display panel or optical filter, and to allow maintaining required parallelism between the optical filter and the panel type display apparatus.

This will prevent distortions in the frame member or unnecessary loads on the panel type display apparatus or the optical filter, and allows the provision of the fabrication method for the panel display type television or display type television wherein required parallelism can be maintained between the optical panel and the panel type display apparatus.

DESCRIPTION OF THE PREFERRED EMBODIMENTS

Figure 1:
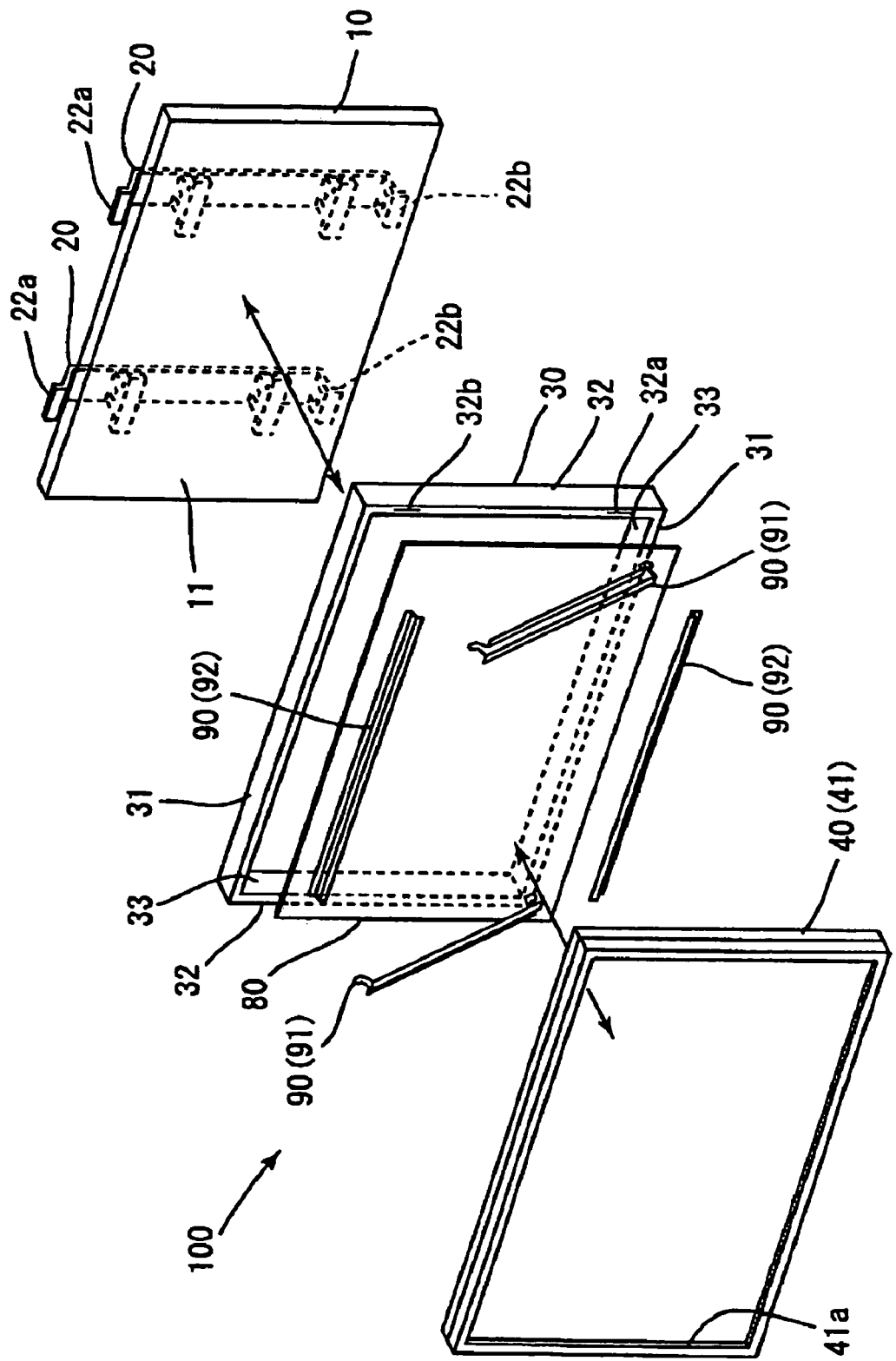
FIG. 1 is a perspective exploded view of a plasma television according to the present invention.

FIG. 1 is a perspective exploded view of a plasma television according to the present invention.

Although the television fabrication method according to the present invention can be used for any flat panel television including an LCD television, fabrication of a plasma television will be described as an example in this embodiment.

As shown in FIG. 1, a plasma television 100 basically consists of a plasma display panel (PDP) 10, a frame 30, an optical filter 80, and a casing 40. The casing 40 comprises a front casing 41 and a rear casing, but the rear casing is not shown here. An opening 41a is formed around the center of the front of the front casing 41, and the PDP 10 is disposed within the casing 40 with its front display surface facing said opening 41a.

In this embodiment, first, the PDP 10 is fixed to brackets 20; the method of fixing the PDP 10 to the brackets 20 will be described later. Next, the brackets 20 supporting the PDP 10 are fixed to a frame 30. As shown in the figure, a top frame contact area 22a and a bottom frame contact area 22b of the brackets 20 extend beyond the top and bottom edges of the PDP 10 respectively. Therefore, the PDP 10 that has been fixed to the brackets 20 is brought close to the back of the frame 30, said frame contact areas 22a and 22b are brought in contact with the corresponding areas on the frame 30 respectively, and then the frame contact areas 22a and 22b are fixed to the corresponding areas on the frame 30 respectively. The fixing method is not limited. For example, it is possible to provide tapped holes in the frame contact areas 22a and 22b and the corresponding areas on the frame 30, and to screw them together.

Said frame 30 consists of four members, i.e., two lateral members 31 that become upper and lower sides of the frame 30 respectively, and two longitudinal members 32 that become right and left sides of the frame 30 respectively. Here, the frame 30 is a member to surround the PDP 10, and therefore each of the lateral members 31 and longitudinal members 32 is designed so that the PDP 10 is accommodated within the frame. However, to prevent the PDP 10 and the frame 30 from putting their own weights on each other, the frame 30 is designed to have a size enough to accommodate said PDP 10 within the frame 30 so that no edge of all four sides of the PDP 10 touches the inner walls 33 of the frame 30, as described below.

After the PDP 10 and frame 30 are combined with the bracket 20, the optical filter 80 is fixed to the frame 30 with fixtures 90. Specifically, right and left edges of the optical filter 80 are fixed to right and left edges of the front of the frame 30, i.e., front side of the longitudinal member 32, with a first fixture 91, and the upper and lower edges of the optical filter 80 are fixed to upper and lower edges of the frame 30, i.e., front side of the lateral member 31, with a second fixture 92.

After said optical filter 80 is fixed, the front casing 41 is fixed. Specifically, the frame 30 is covered with the front casing 41 and is fastened at a plurality of places. Here again, the fastening method is not limited. For example, it is possible to form tapped holes on the frame 30 and form bosses on the front casing 41, and screw these members using said tapped holes and said bosses. Alternatively, the claws are formed inside the front casing 41 hooked on the concaves formed on the frame 30 to fasten both members. Then, the rear casing fixed to the back of the frame 30, and fabrication of the plasma television 100 is almost completed. Note that the term "casing 40" used below includes both the front and rear casings.

Figure 2:
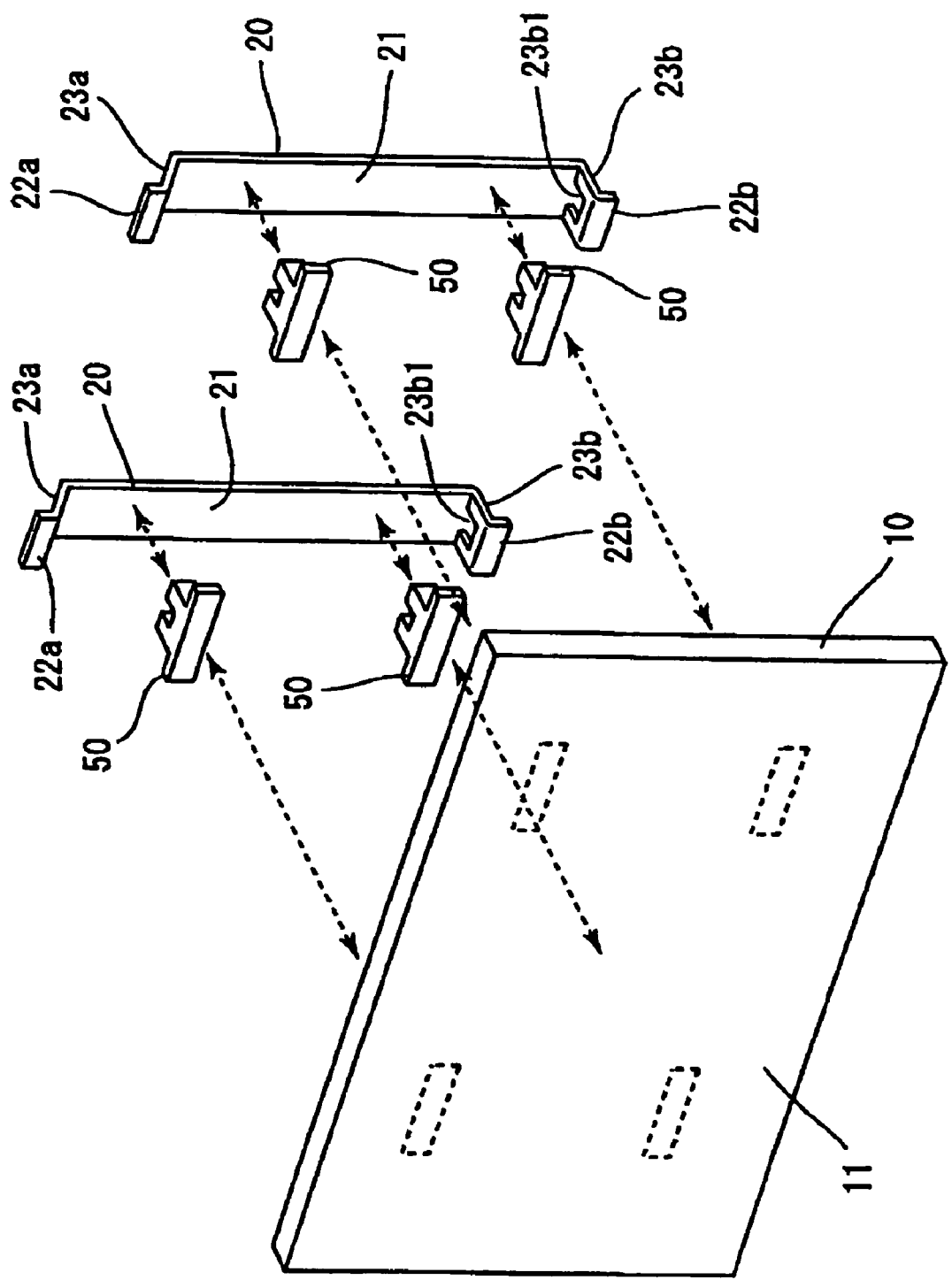
FIG. 2 is a perspective exploded view of a PDP and brackets fixing it.

FIG. 2 is a perspective view showing how to fasten the PDP 10 and the brackets 20.

As described above, the PDP 10 is fixed to the brackets 20 at the rear side of it. In this embodiment, the PDP 10 is not fixed directly to the brackets 20, but fixed to the brackets 20 through attachments 50 used as connecting members.

Figure 3:
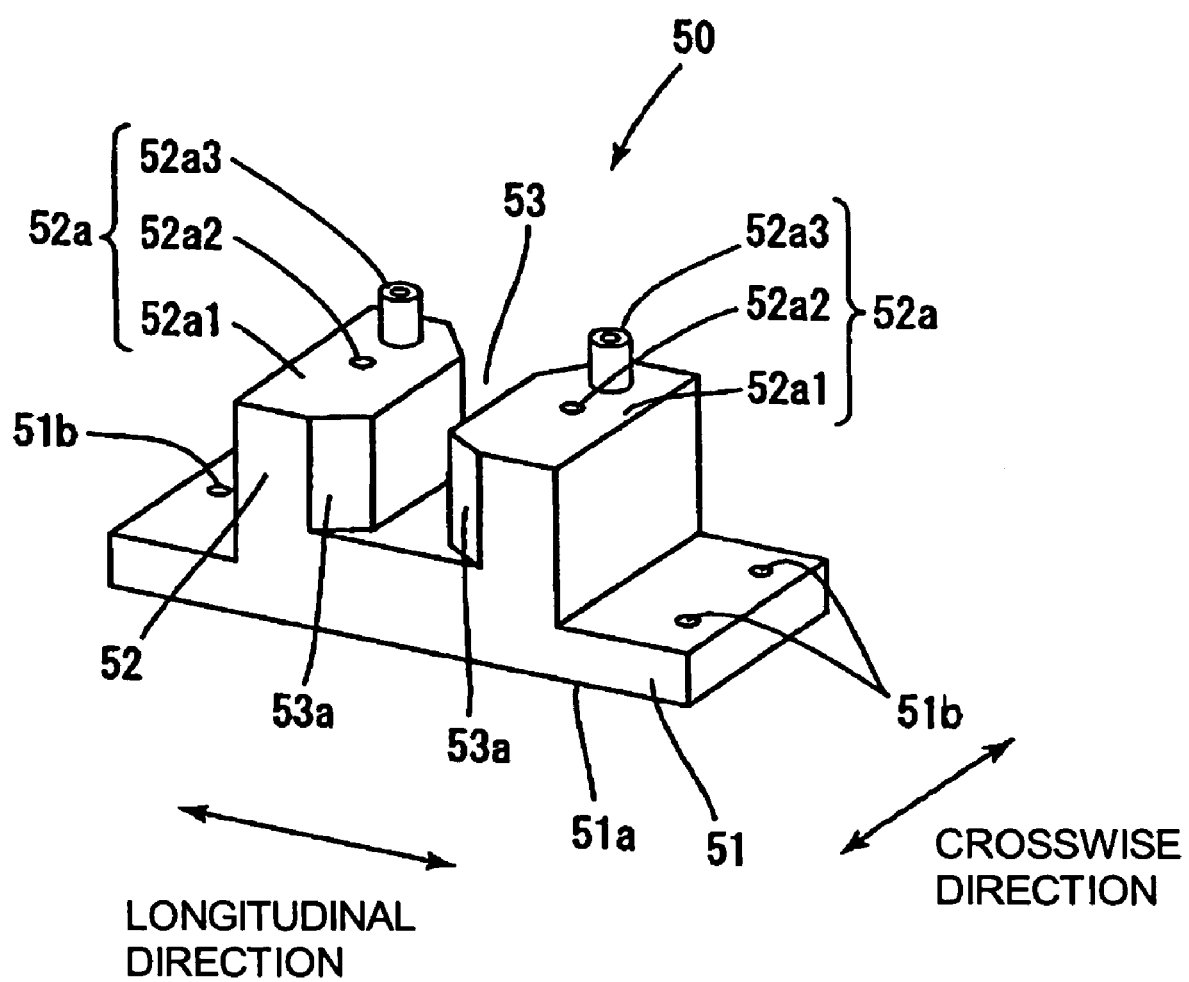
FIG. 3 is a perspective view of an attachment.

FIG. 3 is a perspective view of the attachment 50. The attachment 50 basically comprises a base portion 51 and projecting portions 52 that project approximately perpendicular to one surface of said base portion. The longitudinal length of the projecting portion 52 is shorter than that of the base portion 51, and the crosswise length of projecting portion 52 is almost equal to that of the base portion 51. The opposite surface of the base portion 51 where the projecting portions 52 are not formed is a panel fixing surface 51a to fix the attachments 50 to the rear side of the PDP 10. Also, a plurality of tapped holes 51b are formed through the base portion 51. Accordingly, the panel fixing surface of the attachment 50 contacts a predetermined area at the rear of the PDP 10, and is screwed to the PDP 10 using said tapped holes 51b and tapped holes formed on a predetermined part at the rear side of the PDP 10.

Meanwhile, a concave portion 53 is formed around the center of the top surface 52a1 of the projecting portion 52, which has a predetermined depth and is penetrating across the projecting portion 52. Also, a plurality of tapped holes 52a2 and a plurality of bosses 52a3 are formed on the top surfaces 52a1 between which said concave portion is located. Hereinafter, the portions including the top surface 52a1 and the tapped holes 52a2 and bosses 52a3 formed on the top surface 52a1 are generically called a bracket fixing portion 52a.

In this configuration, the attachments 50 bring the top surface 52a1 or boss 53a3 at the bracket fixing portion 52a into contact with the bracket 20, and are screwed to the bracket 20 using said tapped holes 52a2 or bosses 52a3. When bringing the top surface 52a1 into contact with the bracket 20, a hole is formed beforehand for the boss 52a3 at an area on the bracket 20 corresponding to the boss 52a3, in order to prevent the projecting boss 52a3 from colliding with the bracket 20.

Here, as shown in FIG. 2, the bracket 20 is formed by bending a long plate at a plurality of places. Specifically, said long plate is bent at places near the top and bottom of it in the same direction at a predetermined angle respectively. Then, the long plate is bent again near the top and bottom edges so that the bent portions becomes approximately parallel with the areas on the member to be joined with the bracket. Here, the portion between the top and bottom ends of the long plate is a body portion 21. Also, the edge of the top end that has been bent so as to be in parallel with the body portion 21 is the top frame contact area 22a, and the edge of the bottom end that has been bent so as to be in parallel with the body portion 21 is the bottom frame contact area 22. Further, the portion between the body portion 21 and the frame contact area 22a and the portions between the body portion 21 and the frame contact area 22b are contact areas 23a and 23b respectively.

In the above configuration, the attachments 50 is fixed at predetermined locations on the rear side of the PDP 10. In this embodiment, two attachments 50 are used for one bracket 20. Also, two brackets 20 are used and both brackets 20 are fixed to the PDP 10 so that their longitudinal directions are perpendicular to the lateral direction of the PDP 10. Therefore, a total of four attachments 50 are fixed to the rear side of the PDP 10, two at the upper and lower right and two at the upper and lower left. Also, the attachment 50 is to be fixed to the PDP 10 so that the longitudinal direction of the attachment 50 is parallel with the lateral direction of the PDP 10.

After the attachments 50 are fixed to the PDP 10, the bracket 20 is fixed to the attachments 50. Specifically, the frame contact areas 23a and 23b of the bracket 20, which are at both ends of the body portion 21 and are bent to contact the attachment 50, are brought close to the attachment 50. Then, the bracket fixing portion 52a of each attachment 50 is brought into contact with a predetermined area of the body portion 21 to join both members. Likewise, the two attachments 50 attached to the rear left side of the PDP 10 is fixed to the other bracket 20.

As a result, the PDP 10 is fixed to the two brackets 20 through the attachments 50. Since the longitudinal length of the bracket 20 is almost equal to the height of the frame 30, when the bracket 20 is fixed to the PDP 10, the frame contact areas 22a and 22b extend beyond the upper and lower edges of the PDP 10 respectively, as described above.

Now, the method of fixing the optical filter 80 to the frame 30 will be described.

Figure 4:
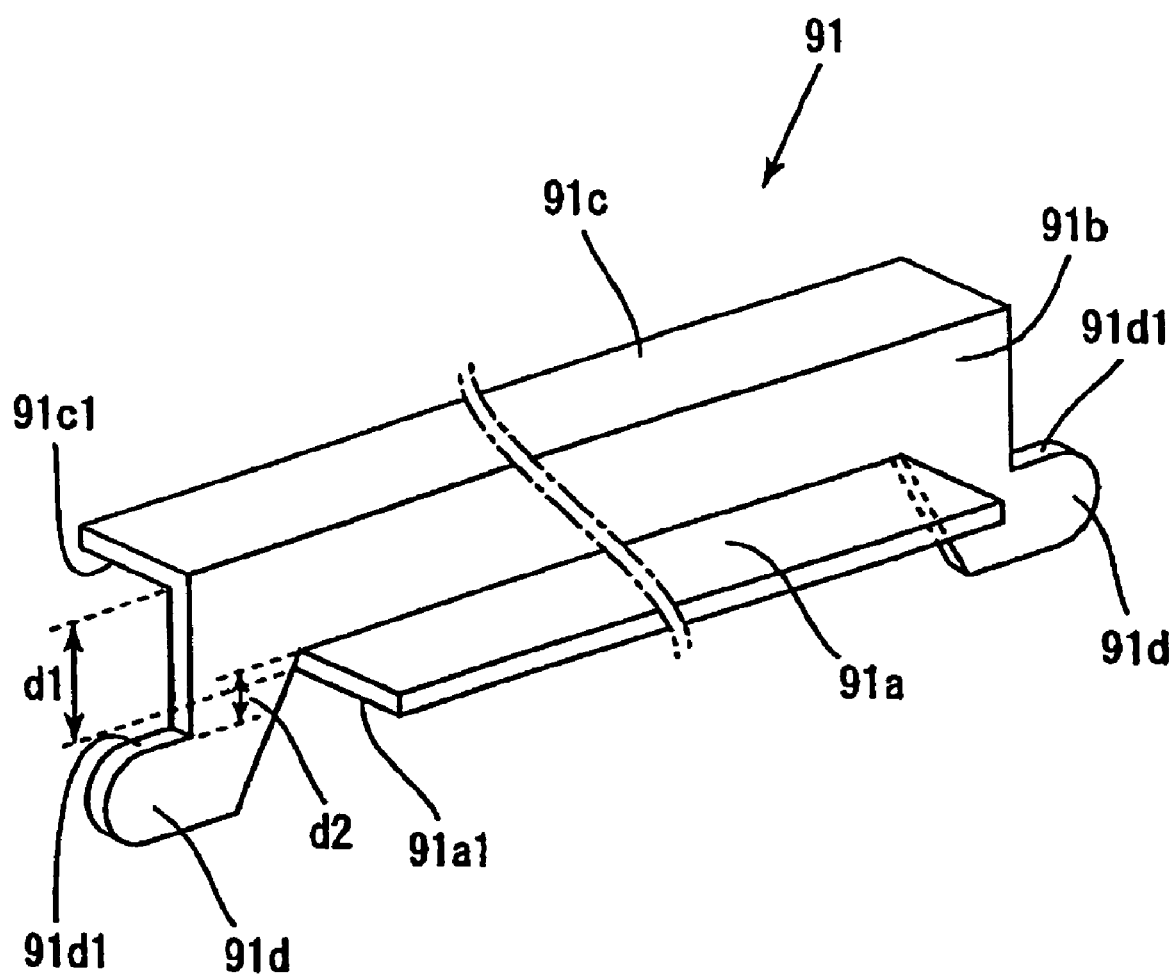
FIG. 4 is a perspective view of a first fixture

FIG. 4 is a perspective view of a first fixture 91. The first fixture 91 is formed by bending a long metal plate like a step by means of press molding, and basically consists of an edge contact portion 91a, a step forming portion 91b, a filter contact portion 91c, and an insert portion 91d. The step forming portion 91b forms a step d1 between the edge contact portion 91a and the filter contact portion 91c. Specifically, the edge contact portion 91a extends from one longitudinal edge of the step forming portion 91d at approximately right angles, and the filter contact portion 91c extends from the other longitudinal edge along the longitudinal direction of the step forming portion 91b toward the opposite direction of the edge contact portion 91a, at approximately right angles. Therefore, the edge contact portion 91a and the filter contact portion 91c are parallel. The step d1 is strictly a distance from the area (the edge contact area 91a1) on the edge contact portion 91a that contacts the frame 30 to the area (the filter contact area 91c1) on the filter contact portion 91c that contacts the optical filter 80.

At each end of the step forming portion 91b, the insert portion 91d is formed, which is formed on almost the same plane as the step forming portion 91b. The insert portion 91d extends a predetermined distance d2 from the edge contact portion 91a toward the filter contact portion 91c, opposite to the direction of forming the step d1, then turns the direction and extends in the direction approximately parallel to the longitudinal direction of the step forming portion 91b, and forms a semicircle at the end. The above distance d2 is the sum of the thickness of the edge contact portion 91a and that of the frame 30 (the longitudinal member 32). Also, an edge of the insert portion 91d which extends in approximately parallel with the longitudinal direction of the step forming portion 91b and is nearer to the edge contact portion 91a is called a frame contact portion 91d1.

Figure 5:
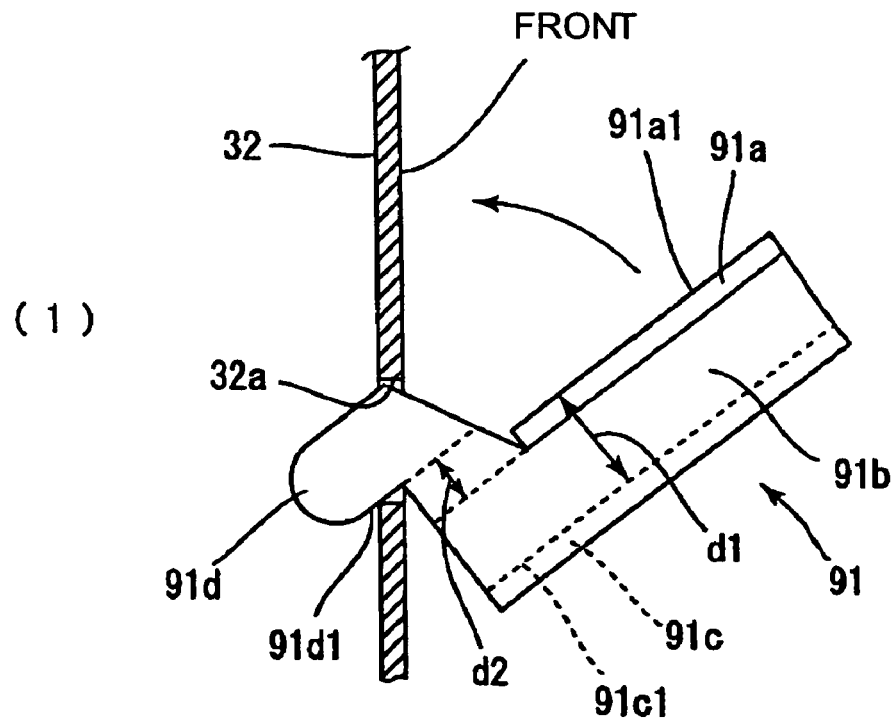
FIG. 5 is a schematic diagram showing how to attach the first fixture to a longitudinal member.
Figure 5:
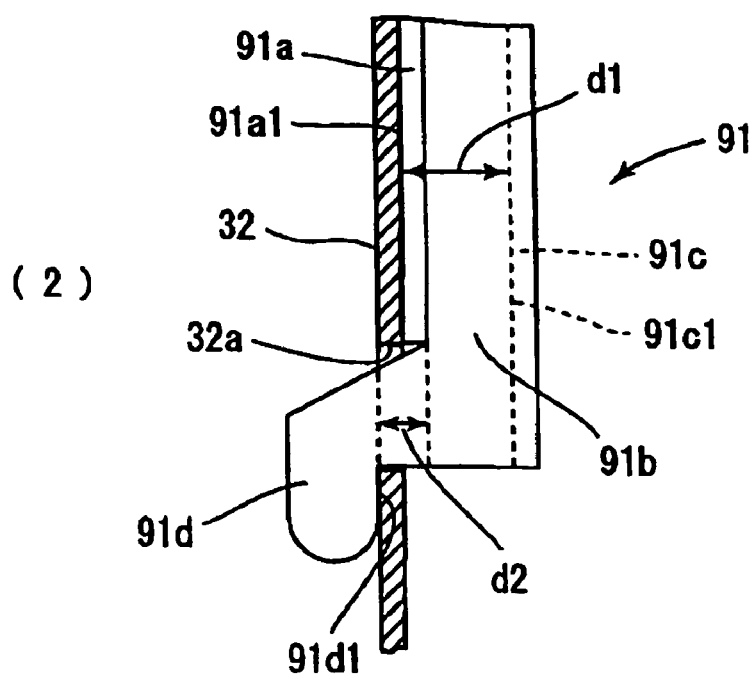

FIG. 5 shows how to install the first fixture 91 on the longitudinal member 32 which is made of metal and has a nearly rectangular cross section.

As shown in (1) of FIG. 5, the edge contact portion 91a is faced toward the front of the longitudinal member 32, and the end of the insert portion of the edge contact portion 91a is inserted into an elongated slit 32a formed on the longitudinal member 32. Then, with the end of the insert portion 91d projecting from the back of the longitudinal member, the edge contact portion 91a is brought close to the front of the longitudinal member 32 and said edge contact area 91a1 brought into contact with the front of the longitudinal member 32. Here, since the end of the insert portion 91d is shaped like a semicircle, it can be inserted obliquely, thus facilitating the fabrication work. Moreover, the end of the insert portion 91d serves as the fulcrum of a lever at this time, and therefore it is possible to press the insert portion 91d with a weak force.

Consequently, as shown in (2) of FIG. 5, the frame contact edge portion 91d1 also contacts the longitudinal member 32 at its back, resulting in the longitudinal member 32 being sandwiched between the edge contact area 91a1 and the frame contact edge portion 91d. Although FIG. 5 shows only the insert portion 91d that is positioned at the bottom when installing the first fixture 91, the insert portion 91d positioned at the top is inserted in whole into a slit 32b formed on the corresponding area on the longitudinal member 32, at the same time when the edge contact portion 91a contacts the longitudinal member 32. In this case, the slit 32b is made vertically longer than the slit 32a so that the insert portion 91d can be inserted into the slit 32b, when the edge contact portion 91a is nearly faced toward and brought close to the longitudinal member.

Further, since the insert portion 91d is formed at both ends of the first fixture 91, it is possible to fix the right and left edges of the optical filter 80 on the right and left longitudinal members 32 respectively with the same fixture. That is, when fixing the optical filter 80 on the left longitudinal member 32, the insert portion 91d positioned at the top of the first fixture 91 is used, and when fixing the optical filter 80 on the right longitudinal member 32, the insert portion positioned at the bottom of the same is used, and the insert portion 91d is inserted into the slit 32a formed on said right longitudinal member 32. Thus, there is no need to form the first fixture 91 for fixing the left edge of the optical filter 80 and the first fixture 91 for fixing the right edge of the same, making it possible to reduce the manufacturing cost of the plasma television 100.

Figure 6:
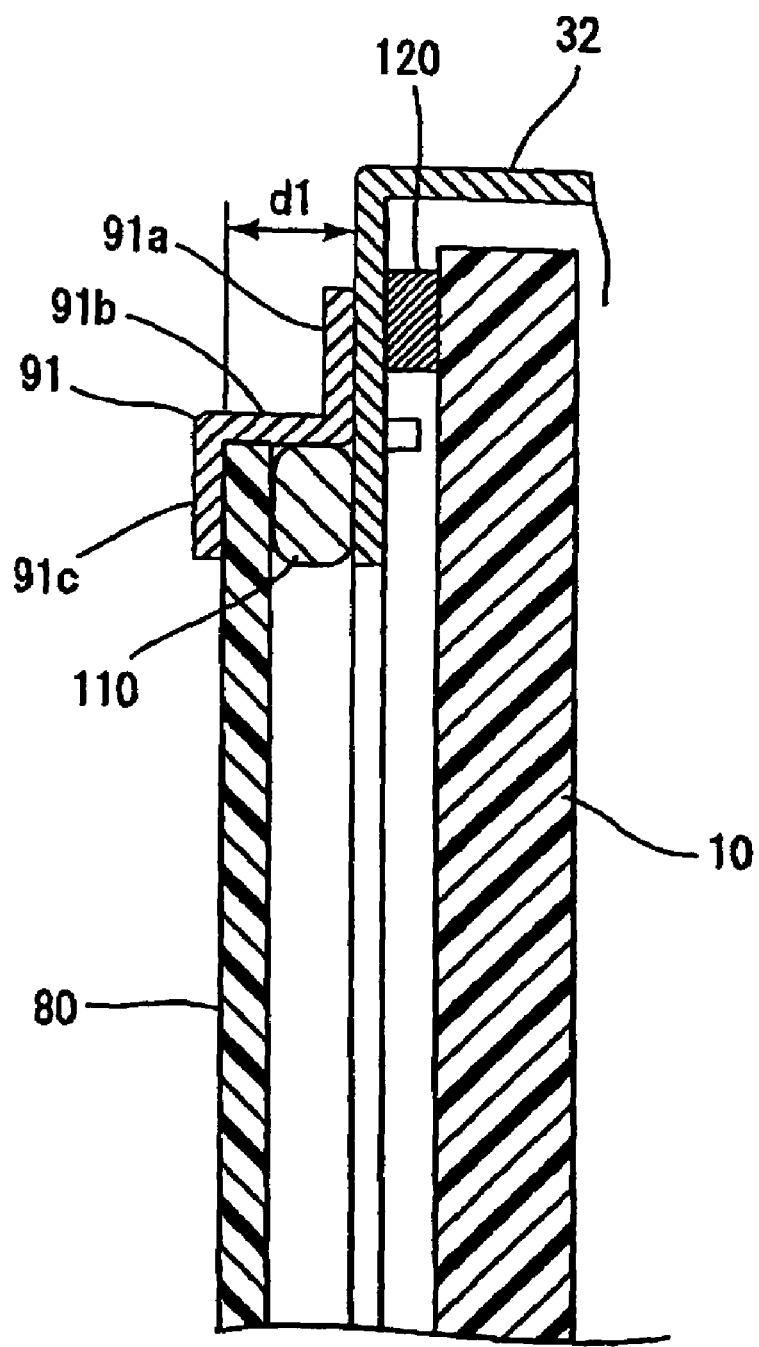
FIG. 6 is a lateral cross sectional view of a part of the plasma television.

FIG. 6 shows how the optical filter 80 is fixed by the first fixture 91 on the frame 30, as viewed from the top.

FIG. 6 is a cross sectional view of the plasma television 100 when it is cut laterally at a certain height in the vicinity of the longitudinal member 32 located on the left of the plasma television 100 as viewed from the front. The optical filter 80 is also fixed to the right longitudinal member 32 in a symmetrical configuration to FIG. 6.

Before fixing the right and left edges of the optical filter 80 with the first fixtures 91, the second fixture 92 shown in FIG. 1 is installed on the lower lateral member 31 at the bottom of the frame 30, and the bottom of the optical filter 80 is held with said second fixture 92. The second fixture 92 is a member that is made by bending a long metal plate like a step, and consists of the edge contact portion, the step forming portion, and the filter contact portion, just like the first fixture 91. However, the second fixture 92 does not have a portion corresponding to said insert portion 91d.

Specifically, the edge contact portion contacts the front side of the lateral member 31, and the filter contact portion contacts the bottom of the front side of the optical filter 80 to roughly hold said optical filter 80 onto the frame 30. In this way, said optical filter 80 is held not to fall, by first holding the bottom of it when fixing the optical filter 80 to the frame 30. As a result, when the optical filter 80 is fixed, it is not necessary for a worker other than one doing this fixing work to support the optical filter 80 to prevent it from falling, thus making it possible to perform the fixing work with fewer workers.

In FIG. 6, the edge contact portion 91a contacts the front side of the longitudinal member 32 almost across the height of the frame 30, when the first fixture 91 is installed on the frame 30. Also, the filter contact portion 91c that is approximately parallel to the edge contact portion 91a faces the front of the longitudinal member 32 at a distance of the step d1 from it. Here, since the edge contact portion 91a and the filter contact portion 91c are nearly parallel, the filter contact portion 91c and the longitudinal member 32 can maintain required parallelism. The optical filter 80 is accommodated within the step d1 created between the filter contact portion 91c and the longitudinal member 32. The filter contact portions 91c contact the left and right edges of the front side of the optical filter 80 across the height of the optical filter 80. Also, the optical filter 80 is pressed against the front of the longitudinal member 32, with the required parallelism with the PDP 10 being maintained. At this time, the PDP 10 itself should have been accommodated within the frame 30 including the longitudinal members 32, with the required parallelism with the frame 30 being maintained.

Here, the optical filter 80 is made of special conductive glass, and covering the display surface 11 of the PDP 10 with the optical filter 80 will have an effect of shielding the electromagnetic waves generated by the PDP 10 (the shielding effect). In addition to said shielding effect, the optical filter 80 enhances the contrast and color reproduction of images displayed on the PDP 10. It is desirable to install the optical filter 80 in as parallel as possible with the PDP 10. Therefore, said required parallelism refers to the degree of parallelism required for the optical filter 80 covering the display surface of the PDP 10.

Also, a gasket 110 is inserted between the longitudinal member 32 and the optical filter 80. The gasket 110 is made of a conductive material such as metal mesh, and has the shielding effect when inserted in a gap between the optical filter 80 and the longitudinal member 32. In order for the gasket 110 to have the required shielding effect, it is necessary to compress the gasket 110 from the original thickness to a predetermined thickness and to insert it in that state between the longitudinal member 32 and the optical filter 80. That is, a sufficient contact area is secured between the longitudinal member 32 and the optical fiber 80, by compressing the gasket 110 down to the predetermined optimal thickness to have the shielding effect (i.e., optimal thickness). This prevents leakages of high frequency waves from the gap between the members and brings about sufficient shielding effect. Said optimal thickness can be 60% of an original thickness, for example.

Therefore, said step d1 is set to a length equal to said optimal thickness to which the gasket 110 is compressed when the optical filter 80 is pressed by the filter contact portion 91c. In other words, said step d1 is the sum of the thickness of the optical filter 80 and the optimal thickness of the gasket 110. This makes it possible, between the filter contact area 91c and the front of the longitudinal member 32, to fix the optical filter 80 to the PDP 10 with the required parallelism maintained, and also to compress the gasket 110 down to the optimal thickness, only by installing the first fixture 91 on the longitudinal member 32.

The installing position of the first fixture 91 is determined simply by inserting the insert portion 91d into the slits 32a and 32b and then bringing the edge contact portion 91a into contact with the longitudinal member 32. To maintain this state, the first fixture 91 is fixed to the longitudinal member 32 with a screw (not shown).

In this embodiment, a plastic spacer 120 is inserted between the frame 30 (in FIG. 6, the longitudinal member 32) and the PDP 10. Normally, the PDP 10 and the optical filter 80 should have an optimal distance between them. Meanwhile, the step d1 formed by said first fixture 91 is determined based on the thickness of the optical filter 80 and the optimal thickness of the gasket 110, and therefore it is essentially difficult to secure said optimal distance by said step d1. Accordingly, the optimal distance is secured between the PDP 10 and the optical filter 80 by inserting said spacer 120.

Figure 7:
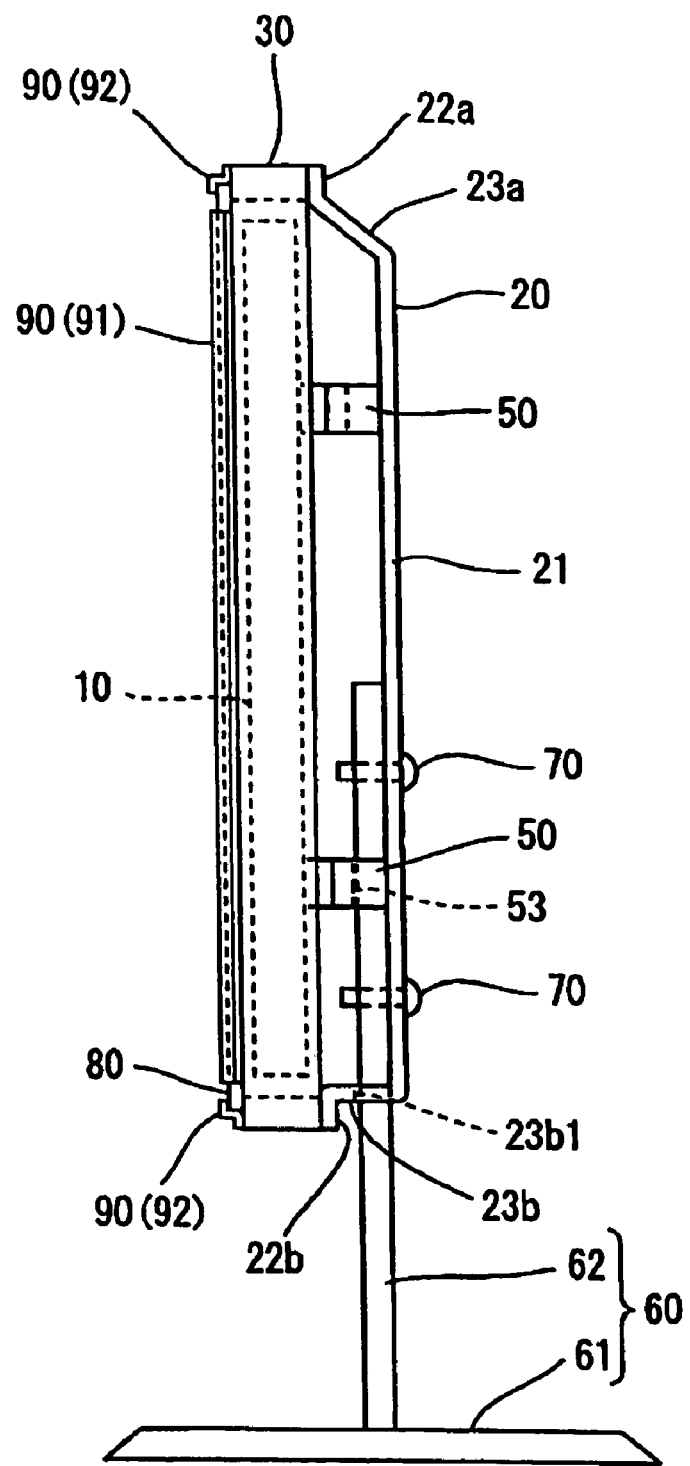
FIG. 7 is a side view of the plasma television showing how the PDP and a frame are supported by a bracket.

FIG. 7 shows how the bracket 20 supports the PDP 10 and the frame 30, as viewed from the side. The casing 40 that is fixed to the frame 30 is not shown here.

As described above, the PDP 10 is fixed to the bracket 20 through the attachment 50, and the frame 30 is fixed to the bracket 20 through the frame contact areas 22a and 22b. The optical filter 80 is fixed to the frame 30 with the fixtures 90. As shown in FIG. 7, the frame contact areas 22a and 22b on the bracket 20, which are used to fix the frame 30, are on almost the same plane as the backs of the frame 30 and PDP 10, but the body portion 21 is located at a predetermined distance from the back of the PDP 10, As a result, a certain space is secured between the back of the PDP 10 and the body portion 21.

It is necessary to provide a predetermined space on the rear side of the PDP 10, for disposing circuit boards for control circuits and power supply circuit as well as various electronic components. Therefore, the shape of said bracket 20 may be one of the optimal shapes for fixing the frame 30 at the upper and lower edges as well as fixing the PDP 10 that is to be accommodated within said frame 30, and has various circuit boards and electronic components disposed on its back.

In FIG. 7, the bottom of the bracket 20 connects to a leg member 60. Said leg member 60 consists of a base portion 61 that is placed directly on a floor or the like, and a leg portion 62 that stands almost vertically from said base portion 61. Although various methods are conceivable for connecting the bracket 20 and the leg portion 62, they are connected as follows in this embodiment.

A through-hole 23b1 large enough for the leg portion 62 to pass through is formed, on a connection area 23b that connects the body portion 21 with the frame contact area 22b. Also, a concave portion 53 of said attachment 50 is designed to be large enough for the leg portion 62 to pass through. That is, the attachment 50 is not only used between the PDP 10 and the bracket 20 to join them, but also used to position the leg member 60 supporting the plasma television 100, by passing the leg portion 62 in its concave portion 53. Also, as shown in FIG. 3, at the area on the concave portion 53 which is opening toward the side of the projecting portion 52, a slope 53a is formed in the direction in which the width of said concave portion 53 increases toward said side of the projecting portion 52. Consequently, the leg portion 62 is effectively guided deep into the concave portion 53 on the slope 53a, when passing the leg portion 62 in the concave portion 53.

Said leg portion 62 is passed through the through-hole 23b1 and the concave portion 53, and the corresponding portions of said leg portion 62 and the body portion 21 are firmly joined with screws 70. This integrates the bracket 20 and the leg member 60, making it possible to support almost whole plasma television 100 including the PDP 10, frame 30, and optical filter 80 at a predetermined height aerially.

Thus, the PDP 10 and the frame 30 are separately fixed to the bracket 20 that supports the weight of the whole plasma television including the leg member 60. Also, the frame 30 surrounds the PDP 10 but does not contact it. As a result, the PDP 10 and the frame 30 do not put their own weights on each other, or the optical filter 80 and the PDP 10 do not put their own weights on each other. This prevents a distortion of said frame 30 due to the weight of the PDP 10 on the frame 30 in a state to hold the optical filter 80 on the front, and also prevents an unnecessary load, namely the optical filter 80, from being put on the PDP 10 that is a precision machine.

As described above, the PDP 10 has circuit boards including a control circuit and a power supply circuit as well as various electronic components, and normally the total weight is heavier than other flat panel displays such as an LCD panel. Especially, with a large sized model, the weight of the PDP 10 has a serious effect on the frame 30 and the optical filter 80. Moreover, as size of the PDP 10 increases, the size and weight of the optical filter 80 covering the display surface 11 of the PDP 10 increase. Therefore, applying the configuration of the present invention to a large sized plasma televisions is very useful, in terms of protection of the optical filter 80 and the PDP 10.

In addition, the present invention has the following effect:

Conventionally, the plasma television 100 was fabricated by fixing the optical filter 80 directly to the casing 40, and then installing PDP 10 in the casing 40. Because of this, from the stage where circuit boards and components are installed in the casing 40 and tuned, the PDP 10 was conveyed through each stage with the casing 40 already installed on it. Installing the casing 40 at an early stage of a fabrication process like this may cause various impacts and/or loads to be put on the casing 40 at each stage by human error or by accident. As a result, finished products were sometimes regarded as defective due to flaws or distortions on the casing 40 at the time of shipment.

According to the present invention, however, the optical filter 80 is installed on the frame 30 fixed to the bracket 20 that is integrated into the leg member 60. That is, according to the present invention, the installation and tuning of all the circuit boards and components to be accommodated in the casing 40 can be finished before installing the casing 40 on any member. This allows the casing 40 to be installed at the final stage of a product fabrication, and therefore there will be few chance of unnecessary loads or impacts being put on the casing 40. Consequently, the probability of finished products being regarded as defective due to flaws or distortions on the casing 40 will be substantially reduced.

Thus, with the PDP 10 and the frame 30 separately fixed to the bracket 20 which is connected to the leg member 60, fix the optical filter 80 to the frame 30 with the fixture 90. As a result, the optical filter 80 is fixed with the required parallelism to the PDP 10 being maintained, and also the optical filter 80 and the PDP 10 will not put their own weights on each other, thus eliminating unnecessary loads put on the optical filter 80 and the PDP 10. Moreover, unnecessary flaws or distortions on the casing 40 can be prevented during a product manufacturing process.

I claim:

1. A plasma television comprising
    a casing having an approximately rectangular opening formed around a center of its front wall;
    a plasma display panel disposed in said casing with its display surface facing the opening;
    a frame member surrounding said plasma display panel and disposed in said casing;
    an optical filter fixed to said frame member; and
    a predetermined fixture to fix said optical filter to said frame member,
wherein
    said plasma display panel is fixed, at a rear side, to a bracket that connects to a leg member standing almost vertically and supports almost whole of said plasma television at a predetermined height;
    said frame member is fixed to the bracket at a portion corresponding to each end of upper and lower portions of said bracket;
    said fixture is equipped with a first fixture that fixes each of the right and left edges of said optical filter and a second fixture that fixes each of the top and bottom edges of said optical filter, said fixture fixing said optical filter with required parallelism maintained with the display surface of said plasma display panel,
wherein said first fixture comprises:
    an edge contact portion that contacts right and left front edge portions almost across a height of said frame member;
    a step forming portion that is an edge along a longitudinal direction of said edge contact portion, and bends almost vertically from an edge facing an inside of said frame member to form a predetermined step from said edge contact portion; and
    a filter contact portion that bends almost vertically toward an inside of said frame member from an edge along a longitudinal direction of a side that does not contact said edge contact portion of said step forming portion, and contacts right and left front edges of said optical filter, almost across the height of the optical filter,
wherein
said step forming portion is provided with
    an insert portion at both ends of said step forming portion that is formed on almost the same plane as said step forming portion, and projects in a direction opposite to a direction of forming a step from said edge contact portion, by a distance equal to a sum of a thickness of said contact portion and said frame member, and
wherein
said frame member has an elongated hole formed at each portion that faces said insert portion when the first fixture is installed, for passing said insert portion through it.

2. A panel display type television, comprising:
    a casing;
    a frame member disposed in said casing;
    a panel type display apparatus surrounded with said frame member and disposed in said casing;
    an optical filter fixed to said frame member; and
    a predetermined fixture to fix said optical filter to said frame member,
said frame member and said panel type display apparatus are separately fixed to a support member that supports almost whole of said panel display type television, without putting the weight of said frame member and said panel type display apparatus on each other, and
    said fixture fixes said optical filter to a front edge portion of said frame member, with required parallelism maintained with a display surface of said panel type display apparatus;
    said fixture is equipped with the first fixture that fixes each of right and left edges of said optical filter and the second fixture that fixes each of top and bottom edges of said optical filter, the first fixture comprises
    an edge contact portion that contacts right and left front edge portions almost across a height of the frame member;
    a step forming portion that is an edge along the longitudinal direction of said edge contact portion, and bends almost vertically from an edge facing an inside of said frame member to form a predetermined step from said edge contact portion; and
    a filter contact portion that bends almost vertically toward an inside of said frame member from an edge along a longitudinal direction of a side that does not contact an edge contact portion of said step forming portion.

3. A panel display type television according to claim 2, wherein:
    an insert portion is formed at both ends of said step forming portion that is formed on almost the same plane as said step forming portion, and projects in a direction opposite to a direction of forming the step from said edge contact portion, by a distance equal to a sum of a thickness of said contact portion and said frame member; and
    said frame member has an elongated hole formed at each portion that faces said insert portion when said first fixture is installed, for passing said insert portion through it.

4. A panel display type television according to claim 2, wherein:
    a step formed by said step forming portion is set to the distance equal to a predetermined thickness to which a conductive gasket inserted between said optical filter and the front edge portion of said frame member is compressed, when said fixture is fixed to said frame member and said filter contact portion presses against the right and left front edges of said optical filter.

5. A panel display type television according to claim 4, wherein
    the step is set to the sum of the thickness of said optical filter and the optimal thickness of the gasket, so that the gasket is compressed to the optimum thickness when said filter contact portion presses against said optical filter.

6. A panel display type television according to claim 5, wherein
    said gasket is made of a conductive material such as metal mesh, inserted between a longitudinal member of said frame member and said optical filter so as to have a shielding effect, and compressed to 60% of an original thickness to secure a sufficient contact area with a longitudinal member and said optical filter, to prevent leakages of a high frequency radiation from a gap between the members.

7. A panel display type television according to claim 2, wherein a spacer is inserted between said frame member and said panel type display apparatus so as to maintain a predetermined distance between said panel type display apparatus and said optical filter.

8. A panel display type television according to claim 2, wherein said support member comprises a leg member standing almost vertically and a bracket that supports almost whole of said panel display type television at a predetermined height by connecting said support member to said leg member.

9. A panel display type television according to claim 2, wherein said panel type display apparatus is a plasma display panel.

10. A panel display type television according to claim 2, wherein said first fixture is formed by bending a sheet of flat metal by a press molding.

11. A panel display type television according to claim 3, wherein the end of said insert portion is shaped like a semicircle.

* * * * *